(12) United States Patent
Takano

(10) Patent No.: US 9,174,132 B2
(45) Date of Patent: Nov. 3, 2015

(54) ELECTRONIC GAME DEVICE, ELECTRONIC GAME PROCESSING METHOD, AND NON-TRANSITORY COMPUTER-READABLE STORAGE MEDIUM STORING ELECTRONIC GAME PROGRAM

(71) Applicant: DeNA Co., Ltd., Tokyo (JP)

(72) Inventor: Ayumi Takano, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 70 days.

(21) Appl. No.: 14/044,707

(22) Filed: Oct. 2, 2013

(65) Prior Publication Data

US 2014/0378228 A1 Dec. 25, 2014

(30) Foreign Application Priority Data

Jun. 20, 2013 (JP) .................................. 2013-129578

(51) Int. Cl.
*A63F 13/00* (2014.01)
*A63F 9/24* (2006.01)
*A63F 13/2145* (2014.01)
*A63F 13/25* (2014.01)
(Continued)

(52) U.S. Cl.
CPC .............. *A63F 13/2145* (2014.09); *A63F 13/25* (2014.09); *A63F 13/533* (2014.09); *A63F 13/822* (2014.09)

(58) Field of Classification Search
CPC ..................... A63F 2300/10; A63F 2300/1062; A63F 2300/1068; A63F 2300/1075; A63F 2300/203; A63F 2300/308; A63F 2300/6045; A63F 13/20; A63F 13/214; A63F 13/2145; A63F 13/22; A63F 13/40; A63F 13/42; A63F 13/48; A63F 13/25; A63F 13/533; A63F 13/822
USPC .......... 463/36, 37, 43, 47; 715/700, 757, 764, 715/820, 833, 835, 863; 345/173, 902
See application file for complete search history.

(56) References Cited

U.S. PATENT DOCUMENTS 5,393,072 A * 2/1995 Best ................................ 463/35
5,682,511 A * 10/1997 Sposato et al. ................ 715/716
(Continued)

FOREIGN PATENT DOCUMENTS

JP 2009-247456 10/2009
JP 4705150 6/2010
(Continued)

OTHER PUBLICATIONS

Japanese Patent Application No. 2013-129578; Decision to Grant mailed on Mar. 11, 2014.
(Continued)

*Primary Examiner* — Milap Shah
(74) *Attorney, Agent, or Firm* — Procopio, Cory, Hargreaves & Savitch LLP

(57) ABSTRACT

Image data including a plurality of consecutively arranged images each indicating an option that is selectable as an instruction specifying a next action in an electronic game is stored. An image area indicating part of the image data is displayed in a command selection area on the touch panel. A slide or a flick, input by a user, on the touch panel is detected. The image area is displayed by scrolling an image area displayed in the command selection area within the image data in response to detection of the input slide or flick.

7 Claims, 13 Drawing Sheets

(51) Int. Cl.
*A63F 13/533* (2014.01)
*A63F 13/822* (2014.01)

(56) References Cited

U.S. PATENT DOCUMENTS

| | | | |
|---|---|---|---|
| 6,884,169 B2 * | 4/2005 | Tsuchida | A63F 13/10 463/31 |
| 8,814,676 B2 * | 8/2014 | De Courssou | G07F 17/32 345/156 |
| 2002/0142833 A1 * | 10/2002 | Tsuchida et al. | 463/30 |
| 2002/0191029 A1 * | 12/2002 | Gillespie et al. | 345/810 |
| 2006/0252531 A1 * | 11/2006 | Kando | A63F 13/10 463/30 |
| 2007/0132789 A1 * | 6/2007 | Ording et al. | 345/684 |
| 2007/0265046 A1 * | 11/2007 | Sato | 463/8 |
| 2008/0194326 A1 * | 8/2008 | Brunet De Courssou et al. | 463/31 |
| 2008/0200261 A1 * | 8/2008 | Spittle et al. | 463/43 |
| 2008/0215981 A1 * | 9/2008 | York et al. | 715/720 |
| 2009/0019401 A1 * | 1/2009 | Park et al. | 715/841 |
| 2013/0127749 A1 | 5/2013 | Yamamoto et al. | |
| 2013/0212530 A1 | 8/2013 | Takase et al. | |

FOREIGN PATENT DOCUMENTS

| | | |
|---|---|---|
| JP | 2012-252384 | 12/2012 |
| JP | 2013-109666 | 6/2013 |

OTHER PUBLICATIONS

Japanese Patent Application No. 2013-129578; Office Action mailed on Oct. 8, 2013.

Daabii Inpakuto Rebyu Keiba Fan nara Unaru Kuority! ("Derby Impact reviews: Horse racing fans will definitely praise its quality!"), Axel Games online gaming site for smartphones, Jun. 19, 2013, Description of "Training," URL, http://axelgames.net/2013/06/19/9526/.

International Publication No. 2012/053489, published on Apr. 26, 2012.

* cited by examiner

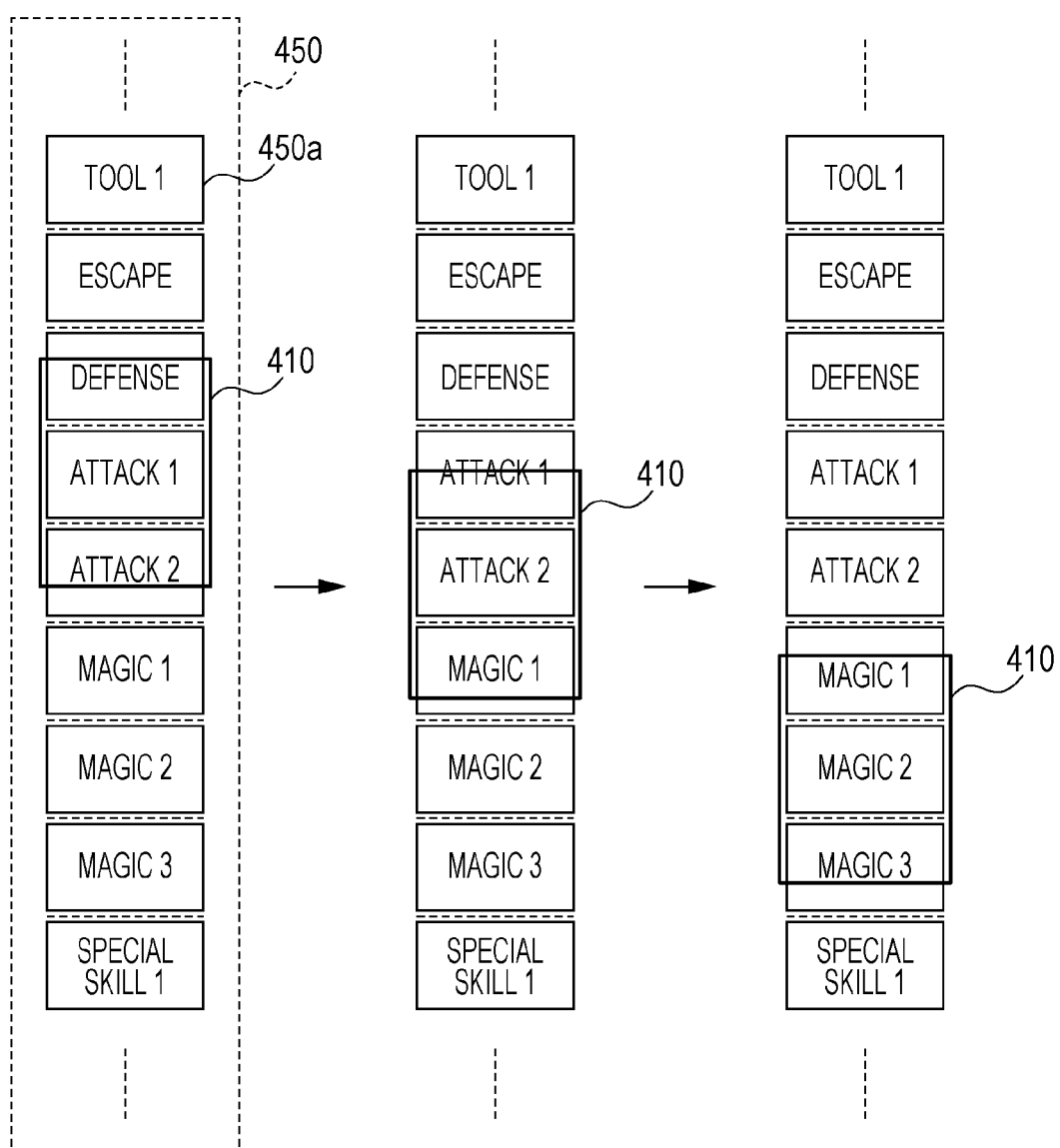

FIG. 13

| CHARACTER 1 | CHARACTER 2 | CHARACTER 3 | SPECIAL PROCESS |
|---|---|---|---|
| ☆ | ☆ | ☆ | DOUBLE ATTACK POWER OF ALLIES |
| ○ | ○ | ○ | DOUBLE DEFENSE POWER OF ALLIES |
| △ | △ | △ | HALVE DEFENSE POWER OF ENEMIES |

FIG. 14

| CHARACTER 1 | CHARACTER 2 | CHARACTER 3 | SPECIAL PROCESS |
|---|---|---|---|
| ATTACK 1 | MAGIC 2 | DEFENSE | INFLICT DOUBLE DAMAGE TO ENEMIES |
| TOOL 1 | TOOL 2 | TOOL 3 | DOUBLE DEFENSE POWER OF ALLIES |
| MAGIC 1 | MAGIC 2 | MAGIC 3 | HALVE DEFENSE POWER OF ENEMIES |

ELECTRONIC GAME DEVICE, ELECTRONIC GAME PROCESSING METHOD, AND NON-TRANSITORY COMPUTER-READABLE STORAGE MEDIUM STORING ELECTRONIC GAME PROGRAM

CROSS-REFERENCE TO RELATED APPLICATION(S)

This application claims the benefit of Japanese Patent Application No. 2013-129578, filed Jun. 20, 2013, the disclosure of which is hereby incorporated by reference in its entirety.

BACKGROUND OF THE INVENTION

1. Field of the Invention

The present invention relates to an electronic game device having an input interface with a "reel", an electronic game processing method for providing the electronic game device, and a non-transitory computer-readable storage medium storing electronic game program.

2. Description of the Related Art

In the related art, electronic games playable on computers, such as role-playing games, have adopted a method for allowing a user to select a command indicating the next action from a menu screen divided into a plurality of hierarchical sub-menus when the user enters an instruction specifying the next action of each character.

For example, as illustrated in FIG. 15, a screen 100 includes an enemy character display area 102 for displaying enemy characters 10a and 10b, an ally character's state display area 104 indicating the states of ally characters operable by a user, a menu area 106 used to issue an instruction specifying the next action of each of the ally characters, and an enemy character's state display area 108 indicating the states of enemy characters. The user selects any one of the commands displayed in the menu area 106 in sequence for each of the ally characters. For example, when the user selects the "Attack" command for Character 1 among the ally characters in FIG. 15, as illustrated in FIG. 16, a sub-menu area 110 indicating selectable types of attacks (sub-commands) is further displayed for the "Attack" command so that the user can further select a sub-command in the sub-menu area 110.

In electronic games, therefore, a process for allowing a user to navigate through a plurality of menu screens to select commands across a plurality of hierarchical sub-menus is performed.

There are an increasing number of electronic games playable on mobile terminals having a touch panel, such as smartphones or tablets. In such mobile terminals, due to the small display area of the touch panel, it is difficult to display a large number of options (commands) on a menu screen at one time.

In addition, since the user selects one of a plurality of options (commands) from a menu area displayed as a further limited display area in a small screen by touching it with a fingertip, the user might feel frustrated when, for example, the user inadvertently touches an unintended option (command).

In electronic game play, furthermore, the user often repeatedly selects commands. Such repeated selection of commands in a small menu area may inconvenience the user.

There is also a demand for creating of new effects in electronic games by combining an input interface and the games to entertain users.

SUMMARY OF THE INVENTION

In an aspect of the present invention, an electronic game device having a touch panel includes a storage unit configured to store image data including a plurality of consecutively arranged images each indicating an option that is selectable as an instruction specifying a next action in an electronic game, an option display unit configured to display an image area indicating part of the image data in a command selection area on the touch panel, and an input detection unit configured to detect a slide or a flick, input by a user, on the touch panel. The option display unit displays the image area by scrolling an image area displayed in the command selection area within the image data in response to detection of the input slide or flick by the input detection unit.

Preferably, at least one of the options is made unselectable in accordance with progress of the electronic game.

Preferably, at least one of the options is made unselectable by making only an image area indicating part of the image data a selectable area in accordance with progress of the electronic game.

Preferably, a plurality of command selection areas are provided on the touch panel, and processing for the electronic game is performed in accordance with a combination of options selected using the plurality of command selection areas.

Preferably, the image data is configured such that images indicating options selected by a user in advance are arranged in order set by the user.

Preferably, the option display unit displays an image area in the command selection area as an initial image, the image area including an image indicating an option that is most frequently selected by a user in the image data or including an image indicating an option recommended using an artificial intelligence (AI) function.

Preferably, the command selection area is provided for each of a plurality of characters for which a next action is instructed in the electronic game.

In another aspect of the present invention, an electronic game processing method using an electronic game device having a touch panel includes storing image data including a plurality of consecutively arranged images each indicating an option that is selectable as an instruction specifying a next action in an electronic game; displaying an image area indicating part of the image data in a command selection area on the touch panel; detecting a slide or a flick, input by a user, with respect to the command selection area as a starting point; and displaying the image area by scrolling an image area displayed in the command selection area within the image data in response to detection of the input slide or flick.

In still another aspect of the present invention, a non-transitory computer-readable storage medium storing electronic game program with an electronic game device having a touch panel causes a computer to execute a process including storing image data including a plurality of consecutively arranged images each indicating an option that is selectable as an instruction specifying a next action in an electronic game; displaying an image area indicating part of the image data in a command selection area on the touch panel; detecting a slide or a flick, input by a user, with respect to the command selection area as a starting point; and displaying the image area by scrolling an image area displayed in the command selection area within the image data in response to detection of the input slide or flick.

According to an aspect of the present invention, the load on the user input in an electronic game may be reduced. In addition, combining an input interface and an electronic game may provide new gaming effects.

BRIEF DESCRIPTION OF THE DRAWINGS

FIGS. 5A to 5C are diagrams illustrating an example of screen data of options (commands) according to the embodiment of the present invention;

FIG. 13 is a diagram illustrating the example combination of the input interface with the electronic game according to the embodiment of the present invention;

FIG. 14 is a diagram illustrating another example combination of an input interface with an electronic game according to the embodiment of the present invention;

DESCRIPTION OF THE PREFERRED EMBODIMENTS

An embodiment of the present invention will be described with reference to the drawings.

Overall Configuration of Electronic Game System

Figure 1:
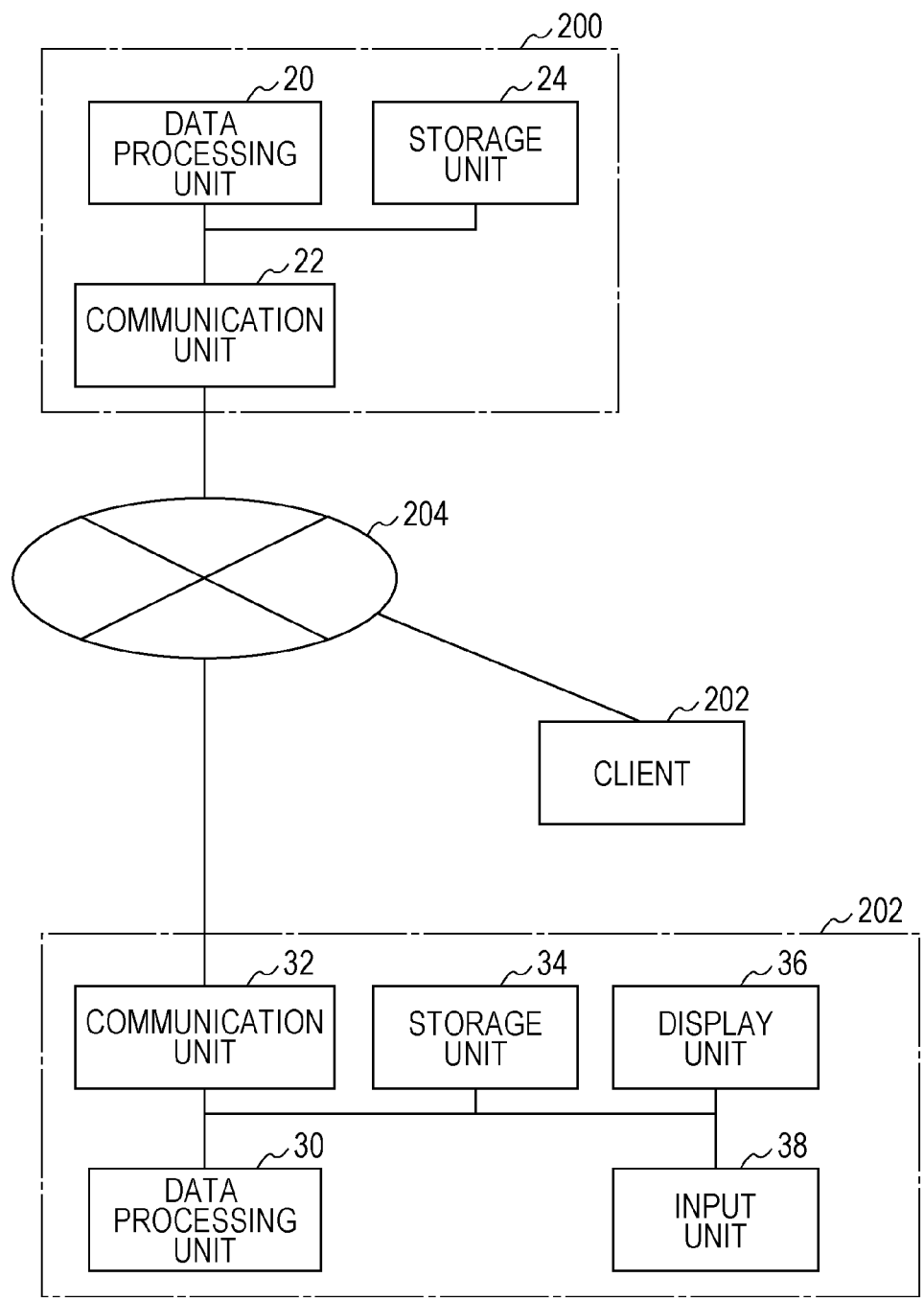
FIG. 1 is a diagram illustrating a configuration of an electronic game system according to an embodiment of the present invention.

FIG. 1 is a diagram illustrating a configuration of an electronic game system according to an embodiment. A server 200 is connected to a client 202 so as to be capable of exchanging information over a network (information network) 204 such as the Internet.

The server 200 may be a computer, and includes a data processing unit 20, a communication unit 22, and a storage unit 24. The data processing unit 20 includes a processing device such as a central processing unit (CPU), and is configured to execute a program stored in the storage unit 24 to perform a process such as transmitting information to the client 202. The communication unit 22 is a unit configured to connect the server 200 to the network 204, and includes an interface through which information is output to the network 204 or information is acquired from the network 204. The storage unit 24 is a unit configured to store and hold electronic information such as an electronic game program or electronic game logic and data, and includes various storage devices such as a semiconductor memory and a hard disk.

In this embodiment, the server 200 is configured to have a function for storing a program (logic) and data concerning an electronic game to be provided, and distributing the program (logic) and the data to the client 202. Alternatively, the server 200 may include an input unit and a display unit so as to be capable of creating or updating a program (logic) and data.

The client 202 may be typically a mobile terminal such as a mobile phone, a smartphone, or a tablet, or may be a personal computer (PC) or any other suitable device. The client 202 includes a data processing unit 30, a communication unit 32, a storage unit 34, a display unit 36, and an input unit 38. The data processing unit 30 includes a processing device such as a CPU, and is configured to execute a program stored in the storage unit 34 to perform a process concerning an electronic game. The communication unit 32 is a unit configured to connect the client 202 to the network 204, and includes an interface through which information is output to the network 204 or information is acquired from the network 204. The storage unit 34 is a unit configured to store and hold electronic information such as an electronic game program or electronic game logic and data, and includes various storage devices such as a semiconductor memory and a hard disk. The display unit 36 is a unit configured to provide the user with image information and text information. The input unit 38 is a unit configured to acquire information from the user. The client 202 may also include an audio output unit and other devices, if necessary.

In particular, preferably, the display unit 36 and the input unit 38 constitute a touch panel through which a user is able to perform an input operation by touching a screen on which an image is to be displayed with a fingertip, a stylus, or any other suitable tool. The client 202 obtains a desired electronic game program (electronic game logic) and data from the server 200 via the network 204, and executes processing activities such as game play. The client 202 displays ally characters, enemy characters, and so forth on the screen using the display unit 36 in accordance with the progress of the game, and also receives instructions from the player using the input unit 38.

In this embodiment, the client 202 receives an electronic game program (logic) and data from the server 200, and executes the electronic game program (logic), thereby functioning as an electronic game device.

In this embodiment, by way of example, the client 202 acquires an electronic game program or electronic game logic and data from the server 200 via the network 204, and executes the electronic game program or electronic game logic. However, this embodiment is not limited to this example. An electronic game program or electronic game logic and data may be stored in the storage unit 34 of the client 202 in advance, and may be executed to provide an electronic game.

Electronic Game Processing Method

An electronic game processing method according to an embodiment of the present invention will be described. The electronic game processing method according to this embodiment has a feature in an input interface for options (commands), and thus in the following description, focus will be on a method for displaying an image on an input interface and an input method using the input interface.

The input interface according to this embodiment is suitable for use in input to a role-playing game and so forth. However, the input interface may also be used in other situations. The processing for an electronic game itself may be performed in accordance with an existing program, and the input interface according to this embodiment may be used when the user selects an option (command) during the play of the electronic game.

Figure 2:
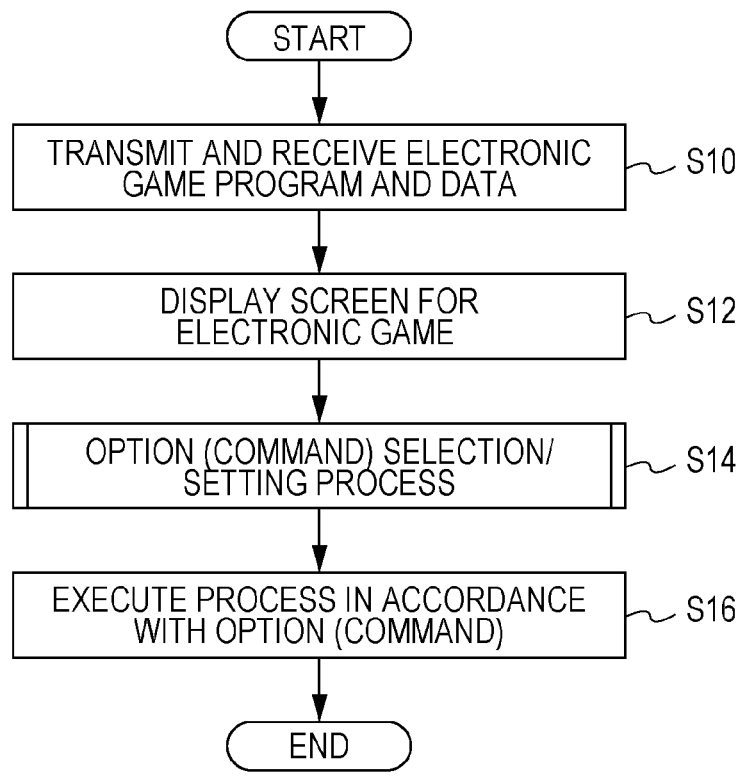
FIG. 2 is a flowchart illustrating an electronic game processing method according to the embodiment of the present invention.

As an example, a process with the input interface when applied to a role-playing game will be described. The process is performed in accordance with a flowchart illustrated in FIG. 2.

In step S10, an electronic game program (or electronic game logic) and data are transmitted from the server 200 to the client 202. The data processing unit 20 of the server 200 reads an electronic game program (or electronic game logic) and data (such as image data and data indicating the characteristics of characters) necessary for the processing for the electronic game, which are stored in the storage unit 24, and transmits the read electronic game program (or electronic game logic) and data to the client 202 via the network 204. The client 202 starts a process using the received electronic game program (or electronic game logic) and data in accordance with a command input in accordance with the electronic game program.

In step S12, the client 202 displays an image on the display unit 36. The client 202 causes the data received in step S10 to be displayed on the display unit 36. For example, in the case where the electronic game is a role-playing game, the data includes image data of enemy characters, image data of ally characters, and so forth. The data may also include information concerning the electronic game, such as information indicating the states of the ally characters and the enemy characters (information concerning items possessed by the characters, such as a hit point (HP) indicating the physical ability of a character, a magic point (MP) indicating the limited use of a command such as a magic power, and a level (Lv) indicating how a character grows in power, etc.). In this case, image data may be generated from the information concerning the electronic game, and may be displayed.

Figure 3:
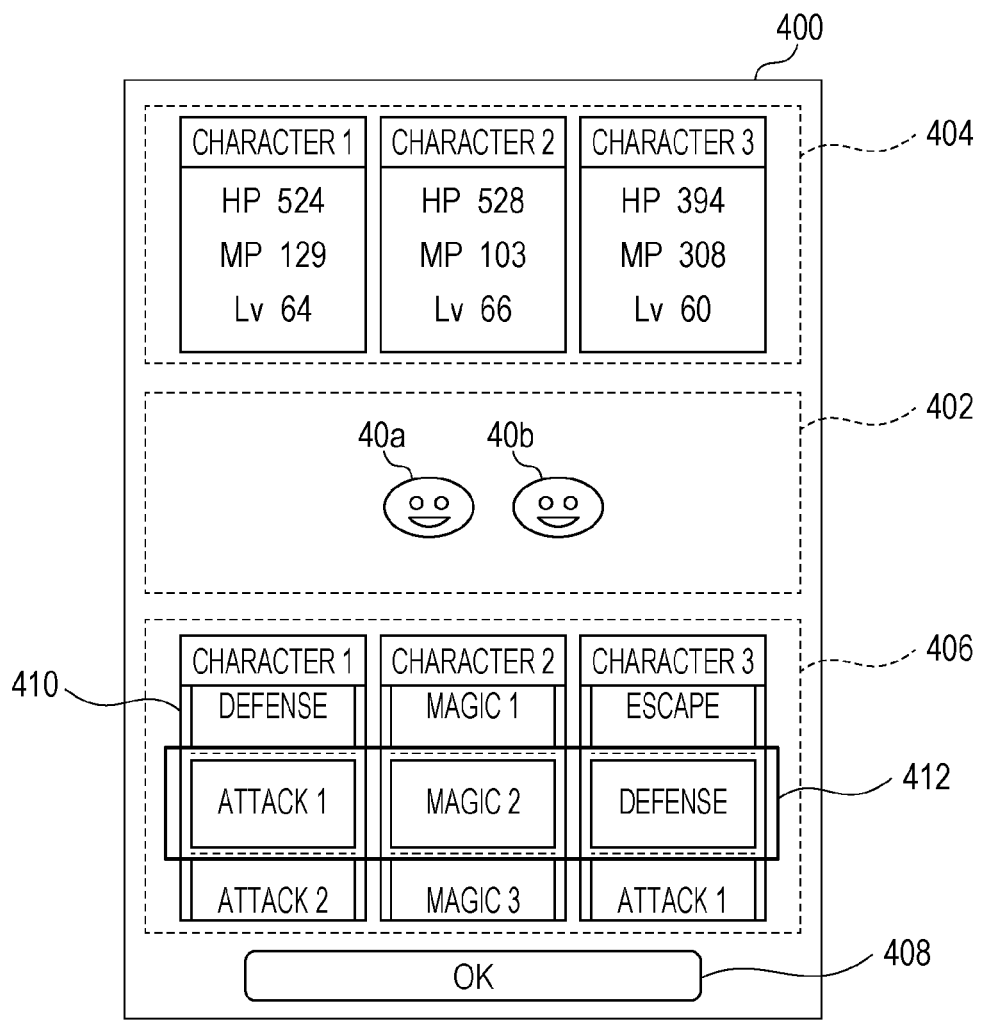
FIG. 3 is a diagram illustrating an example of a display screen for an electronic game according to the embodiment of the present invention.

FIG. 3 illustrates an example of an image displayed on the display unit 36. In the illustrated example, an image 400 includes an enemy character display area 402 including images of enemy characters 40a and 40b, an ally character's state display area 404 indicating the states of ally characters operable by a user, an input area 406 for entering an instruction specifying the next action of each of the ally characters, and a set area 408 for setting the selection of a command.

In step S14, a process for receiving the selection of a command by the user is performed. In the electronic game processing method according to this embodiment, the input area 406 adopts a reel-based selection method.

The reel-based selection method is a method for displaying images indicating options (commands) that are arranged in a selection window, or the input area 406. The input area 406 has command selection areas 410 for the respective ally characters. In each of the command selection areas 410, options (commands) for instructing the next action are displayed. A user slides or flicks his or her finger or a stylus in the direction of movement of the reel (in this embodiment, upward and downward in the drawing) while touching the command selection area 410 with the finger or stylus, thereby sequentially scrolling through a plurality of options (commands) consecutively arranged in the command selection area 410.

Figure 4:
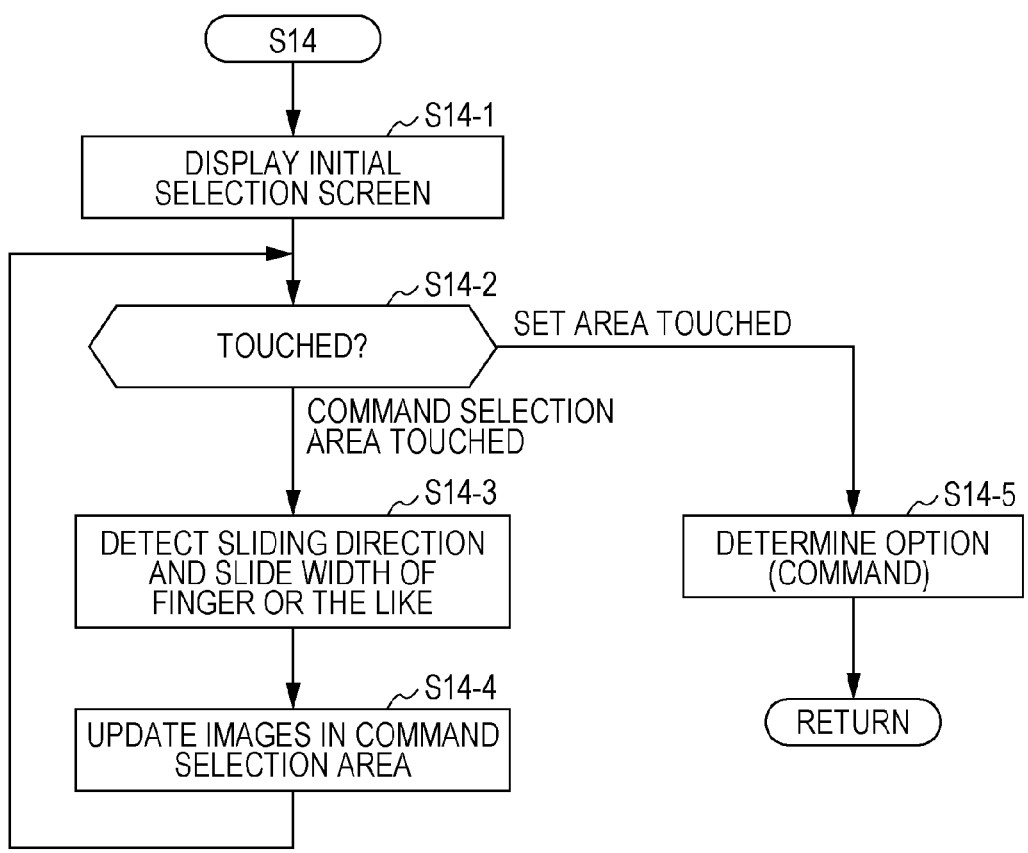
FIG. 4 is a flowchart illustrating a process with an input interface according to the embodiment of the present invention.

A specific example process will be described using a flowchart of a sub-routine illustrated in FIG. 4. In an initial setup, as illustrated in FIG. 5A, a plurality of images 450a indicating options (commands) selectable by a user are consecutively arranged to generate image data 450, and the image data 450 is stored in the storage unit 34. The images 450a indicating the options (commands) included in the image data 450 are each registered in a command database in association with an option (command) for instructing the next action of an ally character in the electronic game.

The data processing unit 30 reads image data in an image area indicating part of the image data 450 from the storage unit 34, and causes the image area indicating part of the image data 450 to be displayed in the command selection area 410 (step S14-1). This is an initial selection screen.

Then, the data processing unit 30 determines whether the input area 406 or the set area 408 displayed on the display unit 36 has been tapped (step S14-2). When a user touches the command selection area 410 or the set area 408 with his or her finger or a stylus, a signal indicating that the command selection area 410 or the set area 408 has been touched is input from the input unit 38 (touch panel) to the data processing unit 30. If the command selection area 410 has been touched, the data processing unit 30 causes the process to proceed to step S14-3. If the set area 408 has been touched, the data processing unit 30 causes the process to proceed to step S14-5.

If the command selection area 410 has been touched, when the user further moves the finger or stylus upward while keeping in touch with the command selection area 410 with it, the input unit 38 (touch panel) senses the movement of the finger or stylus. Then, a signal indicating that a finger or a stylus has been slid or flicked and a signal indicating the slide or flick width is input to the data processing unit 30 (step S14-3). In accordance with the signal indicating the slide or flick width, as illustrated in FIGS. 5B and 5C, the data processing unit 30 reads image data in an image area below the image area currently being displayed in the image data 450, and updates the display of the command selection area 410 (step S14-4). If the slide or flick is performed downward, the process opposite to the process may be performed.

The image area of image data to be read may be an image area shifted pixel by pixel in the sliding or flicking direction with respect to the image area currently being displayed. An increase in the number of pixels to be shifted per display update increases scrolling pitch, and provides quick changing of options (commands) to be displayed. A reduction in the number of pixels reduces scrolling pitch, and provides smooth scrolling of options (commands) to be displayed. For example, preferably, a larger number of pixels are shifted per display update for a higher sliding or flicking speed.

The processing of steps S14-2 to S14-4 is repeatedly performed, thereby displaying the image data 450 having a plurality of consecutively arranged options (commands) on the command selection area 410 so as to scroll through the image data 450. Thus, the option (command) to be selected by the user may be displayed near the center of the command selection area 410 (in FIG. 3, a selection area 412). When the option (command) to be selected is displayed in the selection area 412, the user releases the finger or stylus from the display unit 36, thereby stopping the scrolling of the image data 450, and the option (command) in the command selection area 410 is selected.

If it is determined in step S14-2 that the set area 408 has been touched, the selection of the current option (command) by the user is set. When the user selects options (commands) for the respective ally characters in the command selection areas 410, the user touches (taps) the set area 408 with his or her finger or stylus. Upon receiving a signal indicating that the set area 408 has been touched from the input unit 38, the data processing unit 30 refers to the command database stored in the storage unit 34, and determines that the options (commands) associated with the images of the options (commands) being displayed in the selection area 412 have been selected for the respective ally characters.

For example, the set area 408 is touched in the state illustrated in FIG. 3. In this case, since the image of "Attack 1" is being displayed in the selection area 412 for ally character 1, the command database is referred to and "Attack 1" is selected as an instruction specifying the next action of ally character 1. Likewise, "Magic 2" is selected for ally character 2, and "Defense" is selected for ally character 3.

If an option (command) is set, the data processing unit 30 returns the process to step S16 of the main routine.

Here, the data processing unit 30 functions as an option display unit by performing the processing of steps S14-1 and S14-4. The data processing unit 30 functions as an input detection unit by performing the processing of steps S14-2 and 14-3. The data processing unit 30 functions as a selection setting unit by performing the processing of step S14-5.

Preferably, the command selection areas 410 are provided for the respective ally characters so that the user may select an option (command) for each of the ally characters. In this case, preferably, the image data 450 to be displayed in each of the command selection areas 410 is set for the corresponding one of the ally characters, and includes images indicating a plurality of available options (commands).

Furthermore, the image data 450 preferably includes all the options (commands) across a plurality of hierarchical sub-menus in a configuration of the related art to eliminate or reduce the necessity for selecting options (commands) across a plurality of hierarchical sub-menus, such as in the case of selecting options (commands) from a menu. For example, in a configuration of the related art in which "Magic" is selected from a main menu and one of "Magic 1", "Magic 2", . . . is selected from among sub-menus of "Magic", the image data 450 includes options (commands) in the bottom layer, such as "Magic 1" and "Magic 2".

The number of options (commands) to be included in the image data 450 is preferably, but not limited to, up to approximately 15 to 20 in terms of the time required to navigate all the options (commands) during the scrolling of them.

When the display area of the input area 406 reaches an end (in this embodiment, the upper end or lower end) of the image data 450, the display of images in the input area 406 may be stopped at the end of the image data 450. Alternatively, when the display area of the input area 406 reaches an end (for example, the upper end or lower end) of the image data 450, images from the other end (for example, the lower or upper end) of the image data 450 may be continuously displayed in the input area 406. In this case, images are displayed in the input area 406 in such a manner the one end of the image data 450 is continuous to the other end.

Figure 6A:
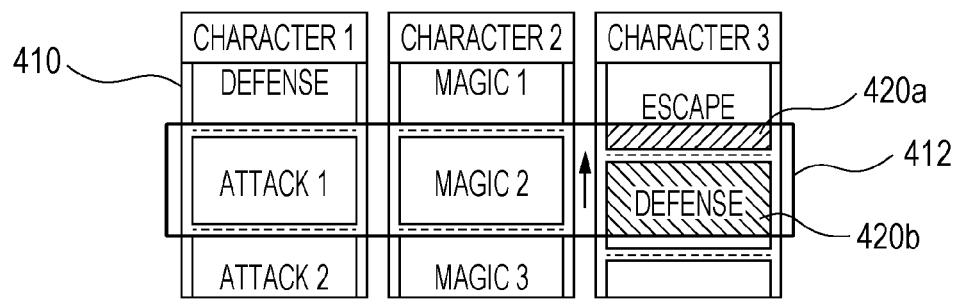
FIGS. 6A and 6B are diagrams explaining processing on the input interface according to the embodiment of the present invention.
Figure 6B:
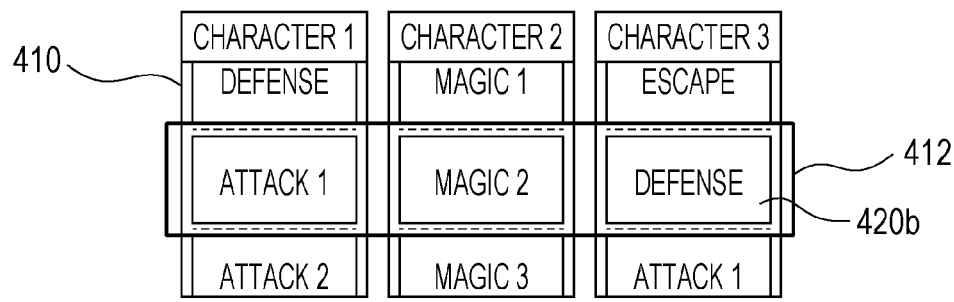

In addition, preferably, processing is performed so that an option (command) is not stopped at a position shifted from the selection area 412 in order to allow appropriate selection of the option (command). That is, as illustrated in FIG. 6A, if scroll is stopped while an area where an option (command) is displayed is shifted with respect to the selection area 412, processing is performed so that images are not displayed with the two areas shifted. For example, as illustrated in FIG. 6A, of an area 420a and an area 420b, the area 420b having a larger area that is being displayed in the selection area 412 is extracted. Then, as illustrated in FIG. 6B, the display of the command selection area 410 is updated so that the area 420b is displayed to fit the selection area 412. The update of the display may make the user feel like clicking when selecting an option (command), and may apparently present what option (command) is being selected to the user.

Inertial scrolling may also be used to display an option (command). Specifically, when a user slides his or her finger or a stylus at a certain speed or more while touching the input area 406, the images of the image data 450 in the input area 406 are continuously scrolled through, without the update of the images in the input area 406 being abruptly stopped, even after the release of the touch from the display unit 36. After that, the update speed of the images in the input area 406 is gradually reduced to gradually slow down scrolling motion, and the motion eventually stops. The display of the image data 450 in the manner described above may reduce the operational load on the user who wishes to move the image being displayed in the input area 406 by a large amount or wishes to view a list of options (commands) included in the image data 450.

Figure 7:
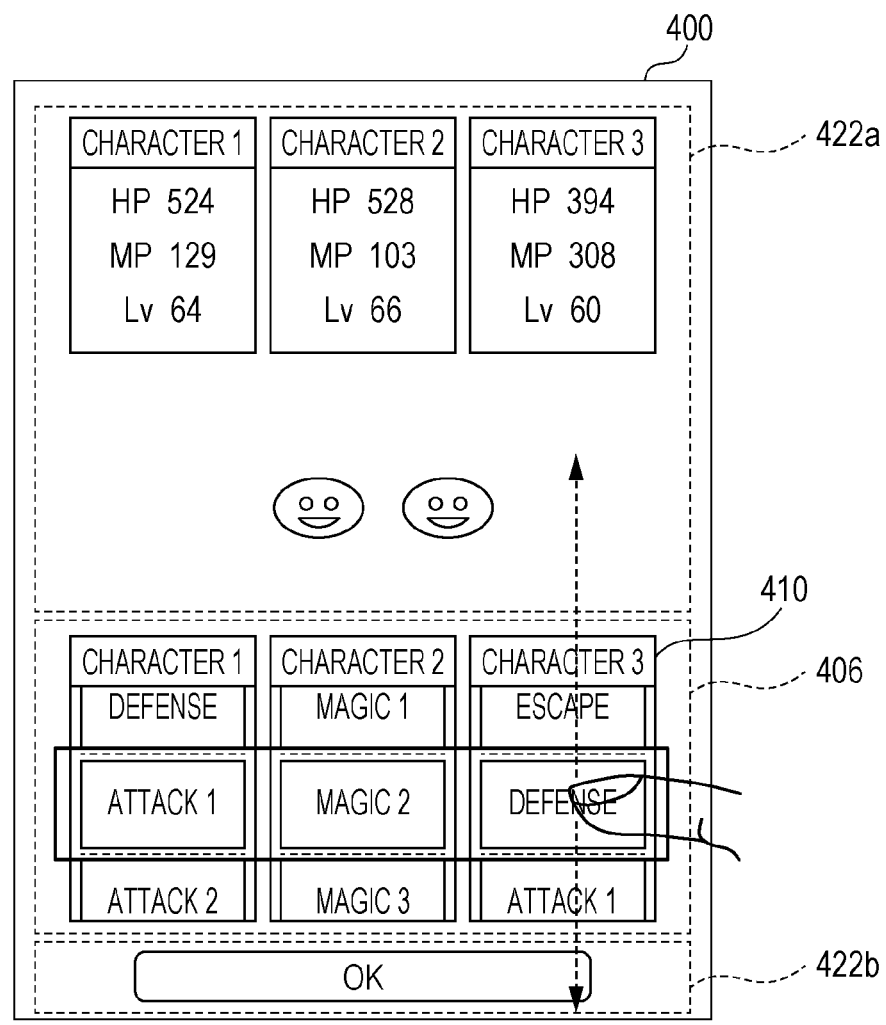
FIG. 7 is a diagram explaining an input range on the input interface according to the embodiment of the present invention.

In addition, as illustrated in FIG. 7, preferably, allowance areas 422a and 422b are provided at ends in the scrolling direction of the input area 406 in the image 400. After the user touches a point in the command selection areas 410 with his or her finger, a stylus, or any other suitable tool, once the user slides the finger or stylus into an area (allowance area 422a or 422b) outside the input area 406 with respect to the associated command selection area 410 as the starting point, the input unit 38 may detect the movement of the finger or stylus, thereby allowing continuous scrolling of the images in the command selection area 410. Accordingly, even if the input area 406 is small, after the user touches any one of the command selection areas 410, the user may use a larger area to instruct scrolling by sliding the finger or stylus. Operability is improved when a display area of options (commands) is scrolled.

Figure 8:
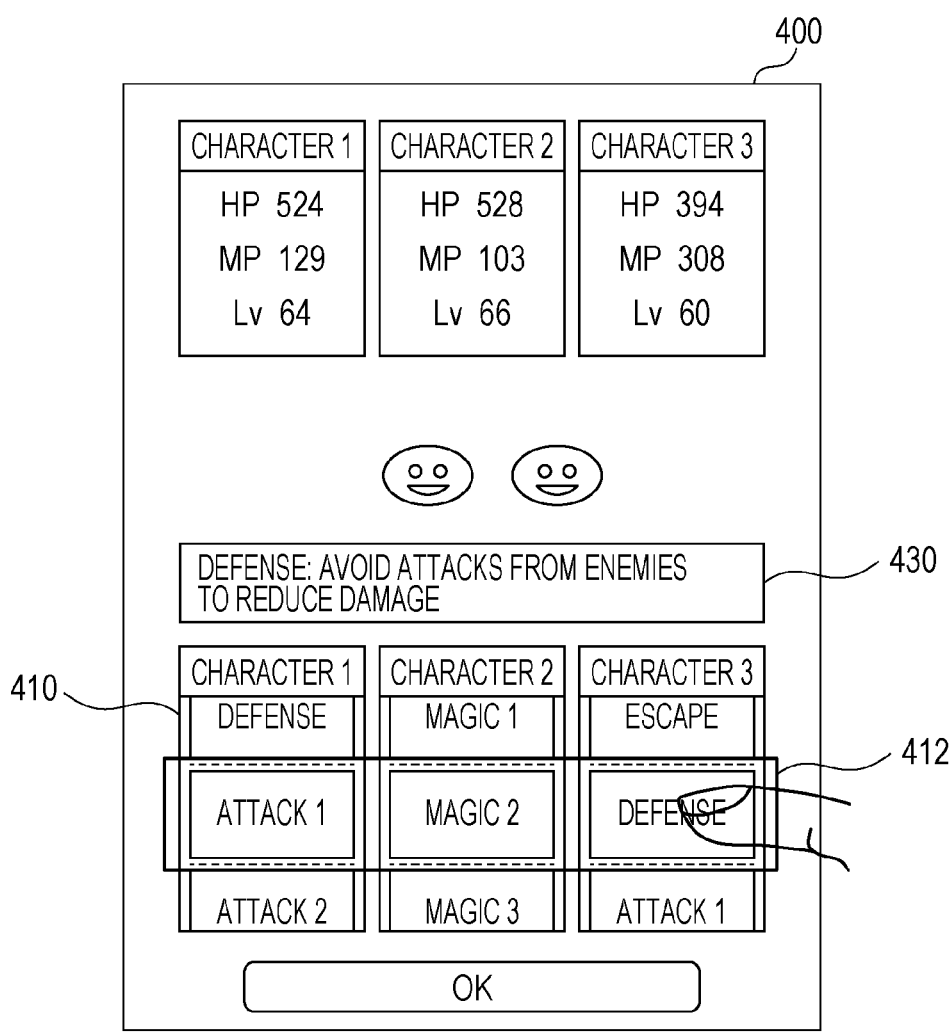
FIG. 8 is a diagram illustrating an example in which a detailed description is displayed according to the embodiment of the present invention.

In addition, as illustrated in FIG. 8, while a user scrolls through images in any one of the command selection areas 410, the name of an option (command) being displayed in the selection area 412 or the details of the option (command) may be displayed in a description area 430. The user may be able to check the information displayed in the description area 430, and may thus be able to readily understand the content of the option (command) being selected.

Referring back to FIG. 2, in step S16, a process corresponding to the selected option (command) is executed. The data processing unit 30 executes a process corresponding to the option (command) for each ally character, which is set in step S14. This process may be performed in a manner similar to the processing for an electronic game of the related art.

For example, in a role-playing game, if "Attack 1" is selected as an instruction specifying the next action of ally character 1, a process for inflicting damage to an enemy character is performed in accordance with the routine defined as "Attack 1" in the electronic game program (logic). In this case, a process for reducing the hit point (HP) of the enemy character is performed. In a case where other options (commands) are selected, processes may be performed in a manner similar to that for an electronic game of the related art.

In this embodiment, accordingly, a reel-based selection method is adopted to select an option (command) to allow an electronic game to proceed. Therefore, even a mobile terminal including a touch panel having a display area so small that it is difficult to display a large number of options (commands) on a menu screen at one time, such as a smartphone or a tablet, may be provided with a user-friendly user interface.

First Modification

In a first modification, an initial image to be displayed in the selection area 412 is an image corresponding to the previously selected option (command). The data processing unit 30 stores in the storage unit 34 an option (command) that has been selected for each ally character in the preceding action. In the process for receiving an instruction specifying the next action, the data processing unit 30 reads the previously selected option (command) from the storage unit 34, and extracts from image data 450 an image area in which an image 450a associated with the read option (command) is displayed in the selection area 412. The extracted image area is displayed in a corresponding one of the command selection areas 410.

For example, "Attack 1" has been selected for character 1 in the previous action. In this case, when an instruction specifying the next action is received, an image area is extracted from the image data 450 so that the image of "Attack 1" is displayed as the initial image in the selection area 412 for ally character 1. Then, the extracted image area is displayed in the command selection area 410.

Through the process described above, the previously selected options (commands) are first displayed in the selection area 412. Thus, the user may be able to readily select the same options (commands) as the preceding options (commands) for the respective ally characters merely by tapping the set area 408.

In addition, the order in which options (commands) in the image data 450 are arranged may be set by the user. The data processing unit 30 stores in the storage unit 34 options (commands) selectable for each ally character, and presents the stored options (commands) to the user so that the user selects an option (command). Further, the data processing unit 30 arranges the options (commands) in order in which they were selected, and stores them in the storage unit 34. The data processing unit 30 further combines images 450a corresponding to the options (commands) in order in which they were stored in the storage unit 34 to generate image data 450.

A reel-based selection process using the image data 450 allows options (commands) that match user's preferences to be arranged in order of user's preference for selection, and may improve comfortableness of the user.

Alternatively, options (commands) that are more likely to be selected may be recommended for each ally character by using the artificial intelligence (AI) function and displayed in the selection area 412. The AI function may be implemented by an existing process. For example, the data processing unit 30 may store in the storage unit 34 options (commands) that have been selected in the past by the user for each ally character, and may combine images 450a corresponding to the options (commands) in order of the highest selection frequency to the lowest selection frequency to generate image data 450. The image 450a corresponding to the option (command) with the highest selection frequency may be first displayed in the selection area 412. Furthermore, the data processing unit 30 may store options (commands) effective for each enemy character in advance in the storage unit 34 in association with the enemy character, so that options (commands) that are effective and associated with the enemy character against which the current action is being taken may be first displayed in the selection area 412.

With the process described above, options (commands) that are more likely to be selected are first displayed in the selection area 412. The user may thus be able to readily select options (commands) for the respective ally characters merely by tapping the set area 408.

Second Modification

In a second modification, a description will be given of an example in which a reel-based selection method is associated with the progress of an electronic game and an electronic game with high entertainment performance is provided.

In an example, the range of options (commands) that are selectable using a reel-based selection method is limited in accordance with the progress of an electronic game. For example, the range of options (commands) may be limited when a player is subjected to a certain attack by an enemy character in the course of electronic game play, or the range of options (commands) may be limited when an ally character is somewhat damaged.

Figure 9:
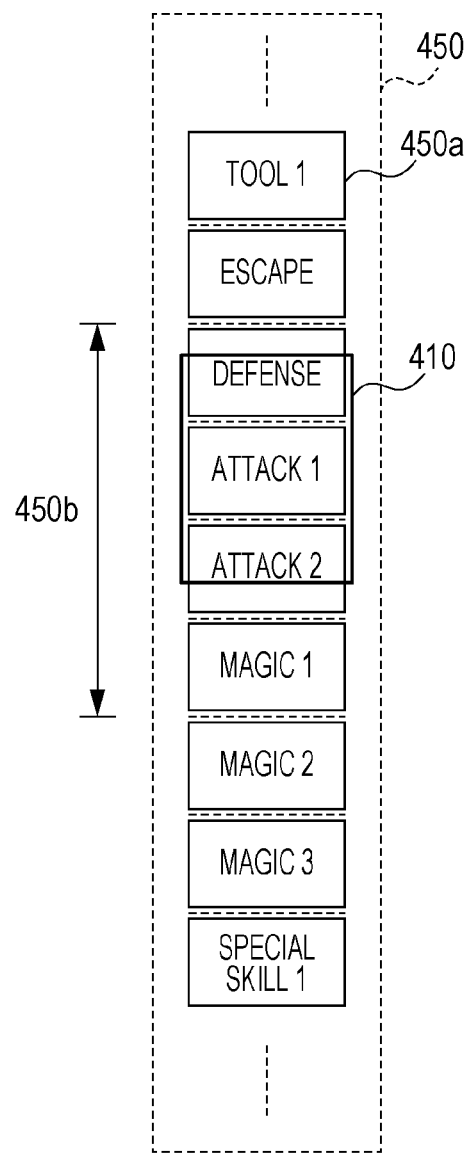
FIG. 9 is a diagram illustrating an example of the setting of a selectable area of options (commands) according to the embodiment of the present invention.

In this case, as illustrated in FIG. 9, the data processing unit 30 performs setting so that only part of the image data 450 is included in a selectable area 450b. For example, only options (commands) that are included in a certain image range from the previously selected option (command) are selectably set. Then, the data processing unit 30 reads image data in an image area included in the selectable area 450b, and displays the read image data in a command selection area 410. While the read image data is being displayed, the user touches the command selection area 410 with his or her finger or a stylus, and then moves the finger or stylus upward (or downward) while keeping in touch with the command selection area 410. In response to the movement of the finger or stylus, the data processing unit 30 reads image data in an image area below (or above) the current display area within the selectable area 450b, and sequentially displays the read image data in the command selection area 410. Accordingly, part of the image data 450 that is included in an image area within the selectably set selectable area 450b is scrolled in the command selection area 410, and only the options (commands) included in the selectable area 450b are made selectable.

Figure 10:
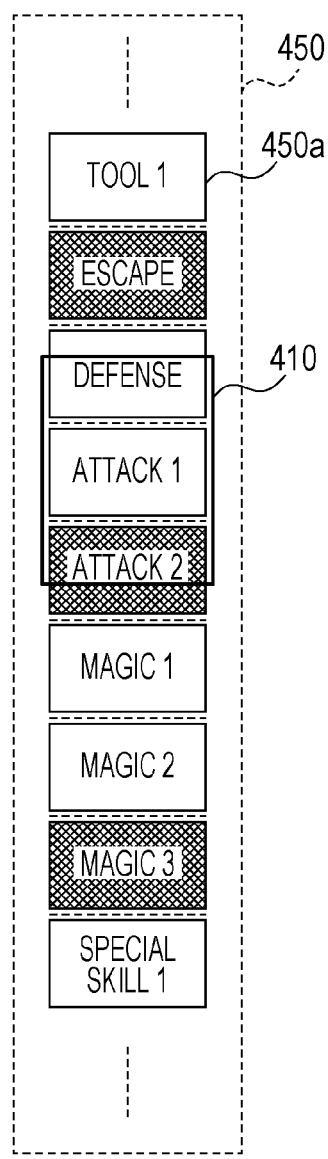
FIG. 10 is a diagram illustrating an example of display of limited options (commands) according to the embodiment of the present invention.

Alternatively, only some of options (commands) may be selectably set. In this case, as illustrated in FIG. 10, preferably, the selectable options (commands) and the other options (commands) may be displayed in a different way. One such different way is that, for example, the selectable options (commands) and the other options (commands) are displayed in different colors. Alternatively, the selectable options (commands) may be displayed with shading, and the other options (commands) may be displayed without shading, or vice versa. Alternatively, the selectable options (commands) may be displayed, and the other options (commands) may be hidden, or vice versa. If the set area 408 is tapped while an option (command) that is not selectable is being displayed in the selection area 412, the data processing unit 30 may perform a process for displaying an indication that the option (command) currently being displayed in the selection area 412 is not selectable on the display unit 36, and prompting the user to select an option (command) again.

In this manner, the width of the selection range of options (commands) in a reel-based selection method may be increased or reduced in accordance with the progress of an electronic game, thereby increasing the entertainment of the electronic game.

Figure 11:
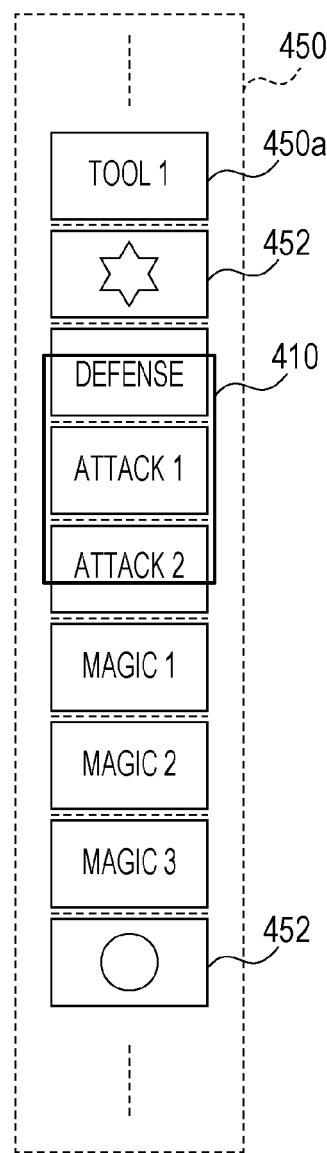
FIG. 11 is a diagram illustrating an example combination of an input interface with an electronic game according to the embodiment of the present invention.
Figure 12:
FIG. 12 is a diagram illustrating the example combination of the input interface with the electronic game according to the embodiment of the present invention.
Figure 15:
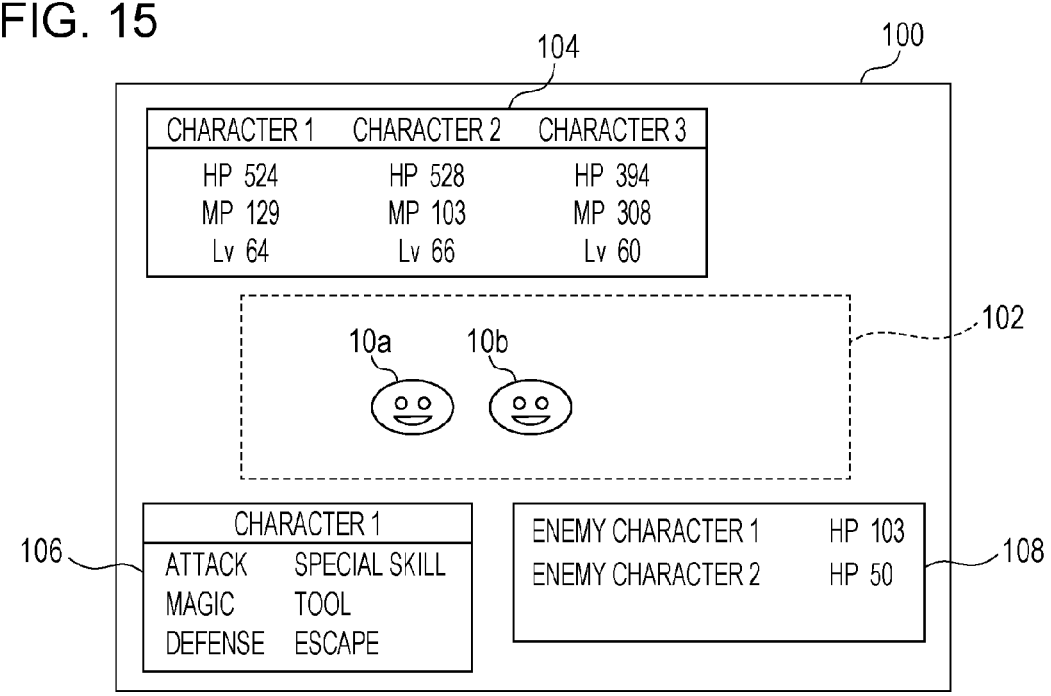
FIG. 15 is a diagram illustrating an example of display of an input interface of the related art for electronic game play.
Figure 16:
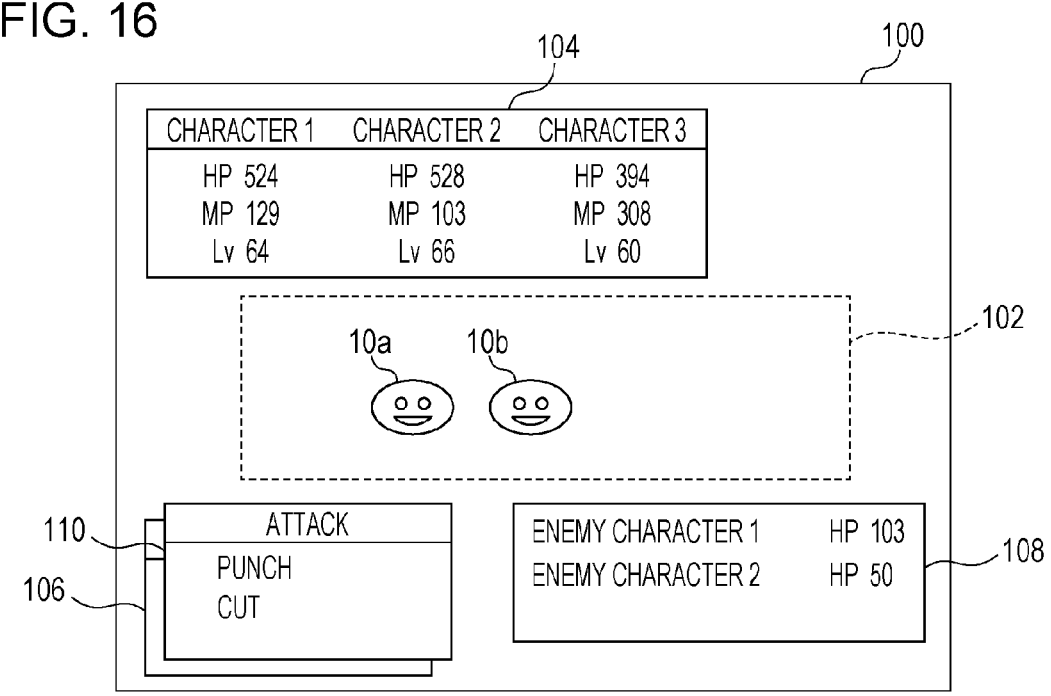
FIG. 16 is a diagram illustrating an example of display of the input interface of the related art for electronic game play.

Alternatively, as illustrated in FIG. 11, in place of images 450a indicating options (commands) or in addition to images 450a indicating options (commands), special images 452 may be additionally included, and additional effects achievable by, for example, a slot game may be added. For example, as illustrated in FIG. 12, a special process may be performed in an electronic game by the arrangement of special images 452 in command selection areas 410 for a plurality of ally characters. Examples of the special process include, as exemplified in FIG. 13, increasing the attack power or defense power of ally characters, and decreasing the attack power or defense power of enemy characters.

Alternatively, a special process may be performed in an electronic game by the selection of a combination of specific options (commands) for a plurality of ally characters. For example, as illustrated in FIG. 14, special processes may be set for combinations of options (commands) selectable for ally characters 1, 2, and 3, and may be stored in the storage unit 34. In response to the actual selection and setting of one of the combinations of options (commands), the corresponding special process may be executed. For example, in FIG. 14, when "Attack 1", "Magic 2", and "Defense" are selected and set for ally characters 1, 2, and 3, respectively, a process for inflicting damage twice as large as normal damage to enemy characters is executed.

Accordingly, an input interface and an electronic game are combined to create new effects, which may entertain users.

What is claimed is:

1. An electronic game device having a touch panel, comprising:
   storage means for storing image data comprising a plurality of consecutively arranged images for each of a plurality of characters, each of the plurality of consecutively arranged images indicative of an option that is selectable as an instruction to specify a next action for each of the plurality of characters in an electronic game, and for storing special process data comprising combinations of selected ones of the selectable options of the plurality of consecutively arranged images having an associated special process;
   option display means for displaying, in each of a plurality of command selection areas, an image area indicating a portion of the image data for each of the plurality of characters, wherein each of the plurality of command selection areas is respectively provided on the touch panel for each of the plurality of characters;
   input detecting means for detecting a slide input or a flick input by a user, on the touch panel, within the plurality of command selection areas to select the options for each of the plurality of characters;
   processing means for, in response to selection of the options for each of the plurality of characters, executing a game command, wherein execution of the game command comprises comparing a combination of the selected options for each of the plurality of characters to the special process data, and executing the associated special process for the combination having the associated special process;
   wherein the option display means scrolls and displays another image area in associated ones of the plurality of command selection areas in response to detection of the slide input or flick input by the input detecting means, the another image area associated with another portion of the image data.

2. The electronic game device according to claim 1, wherein the option display means disables selection of at least one of the options in accordance with progress of the electronic game.

3. The electronic game device according to claim 2, wherein the option display means disables selection of at least one of the options by setting only the image area indicating the portion of the image data as a selectable area in accordance with progress of the electronic game.

4. The electronic game device according to claim 1, wherein the image data is configured such that the consecutively arranged images are arranged in an order set by the user based on options selected by the user in advance.

5. The electronic game device according to claim 1, wherein the option display means displays the image area in the each command selection area as an initial image, the image area including an image from the plurality of consecutively arranged images indicative of either the option that is most frequently selected by the user in the image data or the option recommended using an Artificial Intelligence (AI) function.

6. An electronic game processing method using an electronic game device having a touch panel, the electronic game processing method causing a computer to perform a process comprising:
   a storing step of storing image data comprising a plurality of consecutively arranged images for each of a plurality of characters, each of the plurality of consecutively arranged images indicative of an option that is selectable as an instruction to specify a next action for each of the plurality of characters in an electronic game, and for storing special process data comprising combinations of selected ones of the selectable options of the plurality of consecutively arranged images having an associated special process;
   an option displaying step of displaying, in each a plurality of command selection areas, an image area comprising a portion of image data for each of the plurality of characters, wherein each of the plurality of command selection areas is displayed on the touch panel for each of the plurality of characters;
   an input detecting step of detecting a slide input or a flick input by a user, on the touch panel, within the plurality of command selection areas to select the options for each of the plurality of characters;
   a processing step for, in response to selection of the options for each of the plurality of characters, executing a game command, wherein execution of the game command comprises comparing a combination of the selected options for each of the plurality of characters to special process data, and executing the associated special process for the combination having the associated special process; and
   a scrolling step of scrolling and displaying another image area associated ones of the plurality of command selection areas in response to detection of the slide input or flick input in the input detecting step, the another image area associated with another portion of the image data.

7. A non-transitory computer readable electronic game program that uses an electronic game device having a touch panel, the electronic game program causing a computer to execute:
   a storing step of image data comprising a plurality of consecutively arranged images for each of a plurality of characters, each of the plurality of consecutively arranged images indicative of an option that is selectable as an instruction to specify a next action for the each of the plurality of characters in an electronic game, and for storing special process data comprising combinations of selected ones of the selectable options of the plurality of consecutively arranged images having an associated special process;
   an option displaying step of displaying, in each of a plurality of command selection areas, an image area indicating a portion of the image data for each of a plurality of characters, wherein each of the plurality of command selection areas is respectively provided on the touch panel for the each of the plurality of characters;
   a processing step for, in response to selection of the options for each of the plurality of characters, executing a game command, wherein execution of the game command comprises comparing a combination of the selected options for each of the plurality of characters to the special process data, and executing the associated special process for the combination having the associated special process;
   an input detecting step of detecting a slide input or a flick input by a user, on the touch panel, within the plurality of command selection areas to select the options for each of the plurality of characters; and a scrolling step of scrolling and displaying another image area in associated ones of the plurality of command selection areas in response to detection of the slide input or flick input in the input detecting step, the another image area associated with another portion of the image data.

\* \* \* \* \*